(12) United States Patent
Seelam et al.

(10) Patent No.: US 10,979,531 B2
(45) Date of Patent: Apr. 13, 2021

(54) PESSIMISTIC SCHEDULING FOR TOPOLOGY OPTIMIZED WORKLOAD PLACEMENT

(71) Applicant: INTERNATIONAL BUSINESS MACHINES CORPORATION, Armonk, NY (US)

(72) Inventors: Seetharami Seelam, Chappaqua, NY (US); Minsik Cho, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

(21) Appl. No.: 16/264,570

(22) Filed: Jan. 31, 2019

(65) Prior Publication Data

US 2020/0252481 A1 Aug. 6, 2020

(51) Int. Cl.
*H04L 29/08* (2006.01)
*H04L 12/911* (2013.01)
*H04L 12/24* (2006.01)

(52) U.S. Cl.
CPC .............. *H04L 67/32* (2013.01); *H04L 41/12* (2013.01); *H04L 47/829* (2013.01)

(58) Field of Classification Search
CPC ....... H04L 67/32; H04L 41/12; H04L 47/829; H04L 67/325; H04L 41/5096; H04L 41/5019; H04L 43/0817; H04L 41/5051; H04L 41/0896
See application file for complete search history.

(56) References Cited

U.S. PATENT DOCUMENTS

| | | | |
|---|---|---|---|
| 9,323,561 B2 | 4/2016 | Ayala et al. | |
| 2012/0042061 A1 | 2/2012 | Ayala et al. | |
| 2015/0143381 A1* | 5/2015 | Chin | G06F 9/5005 718/104 |
| 2018/0011741 A1 | 1/2018 | Jayanthi et al. | |
| 2019/0014059 A1* | 1/2019 | Hu | G06F 9/5033 |

OTHER PUBLICATIONS

"Optimizing VM Placement for HPC in the Cloud" Gupta et al. HP Labs Palo Alto, CA, USA, Sep. 21, 2012, San Jose, CA, USA. ( 6 Pages ).

* cited by examiner

*Primary Examiner* — El Hadji M Sall
(74) *Attorney, Agent, or Firm* — Griffiths & Seaton PLLC (57) ABSTRACT

Various embodiments are provided for using pessimistic scheduling for topology optimized workload placement by a processor in a computing environment. An excessive amount of computing resources may be requested (e.g., a pessimistic request) to execute a workload as compared to a required amount of the computing resources to execute the workload. The workload may be assigned to a selected configuration of the excessive amount of computing resources and releasing a remaining amount of the excessive amount of computing resources.

20 Claims, 10 Drawing Sheets

PESSIMISTIC SCHEDULING FOR TOPOLOGY OPTIMIZED WORKLOAD PLACEMENT

BACKGROUND OF THE INVENTION

Field of the Invention

The present invention relates in general to computing systems, and more particularly to, various embodiments for using pessimistic scheduling for topology optimized workload placement by a processor in a computing environment.

Description of the Related Art

In today's society, consumers, businesspersons, educators, and others communicate over a wide variety of mediums in real time, across great distances, and many times without boundaries or borders. A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server.

For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for using pessimistic scheduling for topology optimized workload placement by a processor, are provided. In one embodiment, by way of example only, a method for using pessimistic scheduling for topology optimized workload placement in a cloud-computing environment, again by a processor, is provided. An excessive amount of computing resources may be requested (e.g., a pessimistic request) to execute a workload as compared to a required amount of the computing resources to execute the workload. The workload may be assigned to a selected configuration of the excessive amount of computing resources and releasing a remaining amount of the excessive amount of computing resources.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing resources are usually pre-configured by vendors at fixed levels of configurations. One aspect is that each individual computing resource, such as memory size, number of CPUs, disk size, etc., has a limited boundary. Another aspect is that each computing platform has a limited number of physical customization options. Today's workloads are running under these limitations, which subsequently is a reason that techniques such as memory swapping and caching optimization are used in computing environments.

Generally speaking, cloud computing provides the illusion of an infinite pool of resources and elastically provisions and de-provisions resources to users. This dynamic provisioning comes at cost for performance-sensitive workloads such as, for example, deep learning training and high-performance computing ("HPC"). These workloads require provisioned resources to be in the closest proximity possible to achieve optimal execution times. These workloads have alternate compute and communication cycles and the rate of progress is limited by the machine with slowest compute cycle and the longest communication cycles to other machines.

As such, provisioning virtually identical resources for all tasks and ensuring that the resources can communicate with each other at comparable speeds is critical for scalable performance of Deep Learning ("DL") and HPC applications. In one aspect, one or more dedicated racks of machines may be built for these workloads in cloud data centers, but the dedicated racks of machines may severally constrain elasticity (e.g., being able to add and remove machines) and result in increased cost.

Moreover, a cloud computing scheduler (e.g., a cloud scheduler) may provision resources to workloads as long as the resource is available, and the resource has sufficient capacity to fulfill the job requirement such as, for example, a number of central processing unit ("CPU"), an amount of memory, and number of graphics processing units ("GPU"). For jobs that require multiple nodes, the cloud scheduler can allocate the resource from any part of a cloud computing system (e.g., different racks, different data-centers, different networks). However, jobs suffer from significant performance delays when these resources are not co-located within a single subnet (e.g., a logical subdivision of an internet protocol "IP" suite), single rack, single data-center, etc. Current cloud schedulers are unable to account for network and proximity requirements of coupled resources for these jobs.

Accordingly, the present invention provides for a pessimistic scheduling and placement operation that enables users to run DL and HPC workloads efficiently on elastic cloud resource without sacrificing the performance and without dedicated clusters that are costly. In one aspect, the present invention uses pessimistic scheduling for topology optimized workload placement in a cloud-computing environment. An excessive amount of computing resources may be requested (e.g., a pessimistic request) to execute a workload as compared to a required amount of the computing resources to execute the workload. The workload may be assigned to a selected configuration of the excessive amount of computing resources and release a remaining amount of the excessive amount of computing resources. In this way, the present invention provides for GPU topology-based scheduling that addresses the challenges with cloud resource provisioning.

In an additional aspect, the present invention provides a cloud scheduler such as, for example, by using an existing cloud scheduler in a cloud computing environment. In one aspect, when computing workloads require a certain number of resources, the pessimistic scheduler (e.g., pessimistic cloud scheduler) proactively requests more resources than necessary to run the workload. The present invention provides a placement evaluation engine that may execute/run a set of micro-benchmarks that simulate the workload behavior and estimates how the workload might be impacted for different combinations of the underlying resources. From this assessment, the present invention identifies a subset of resources that maximizes workload performance and informs the pessimistic scheduler. The pessimistic scheduler may release the rest/remaining number of the resources to the cloud computing provider.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
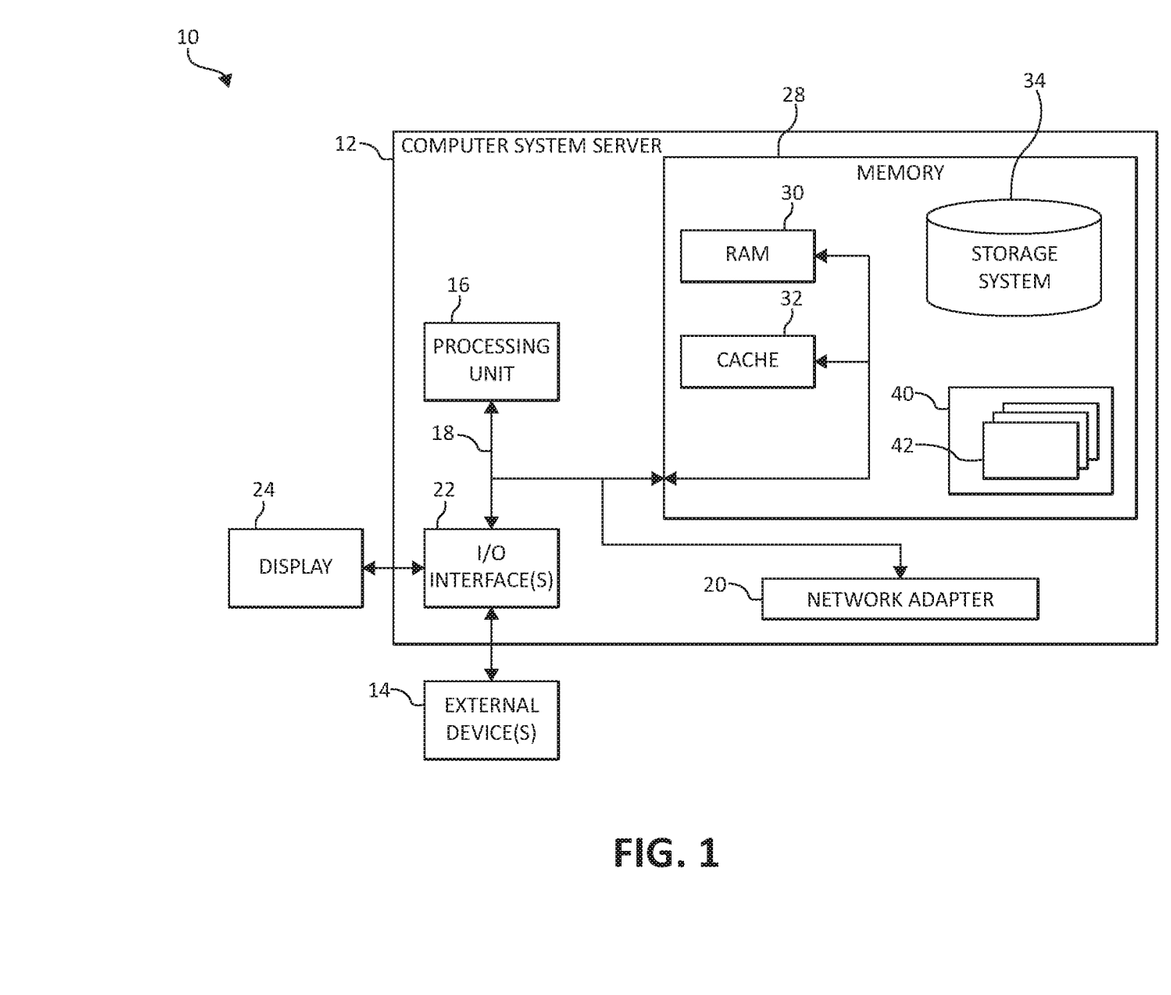
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
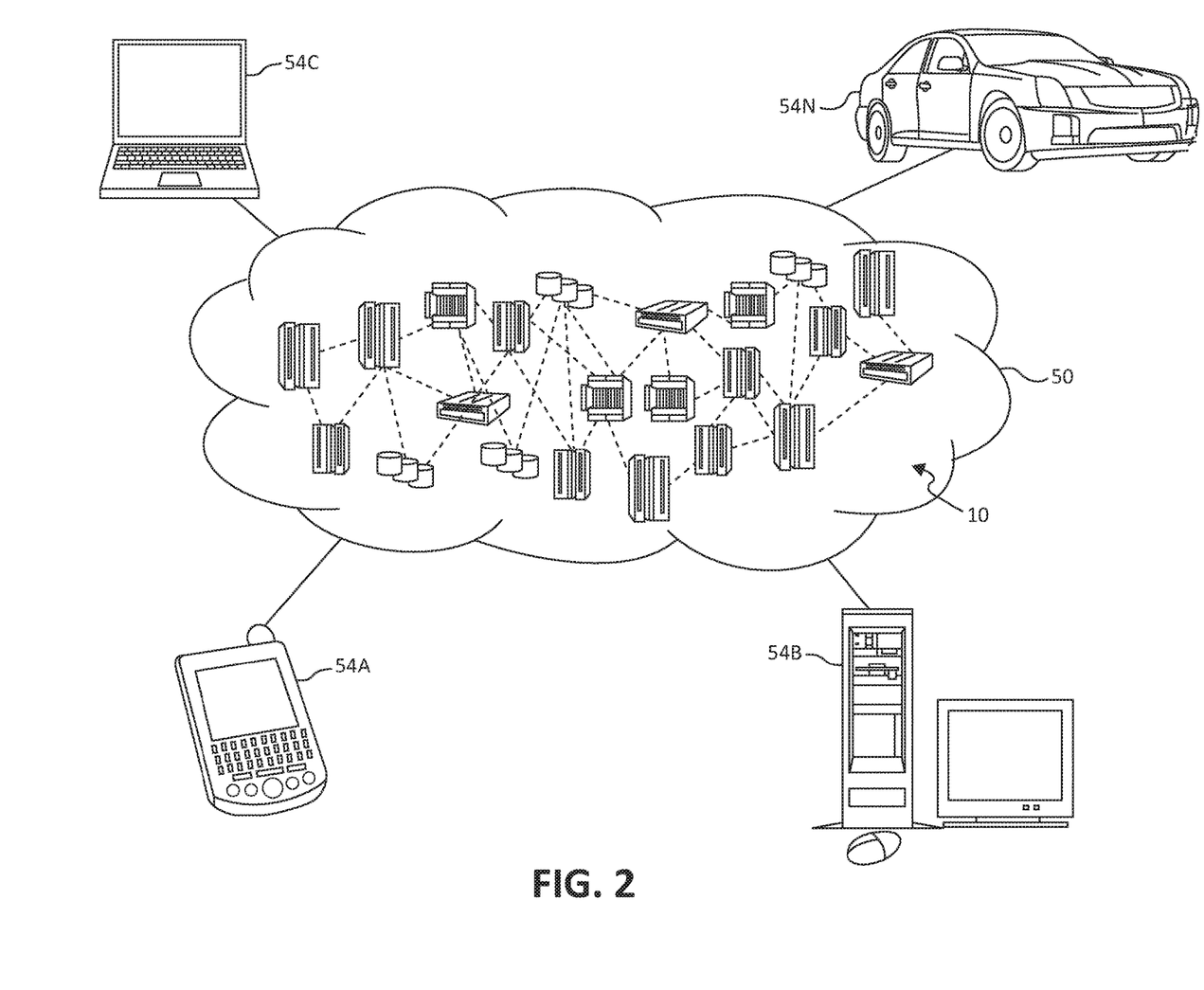
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
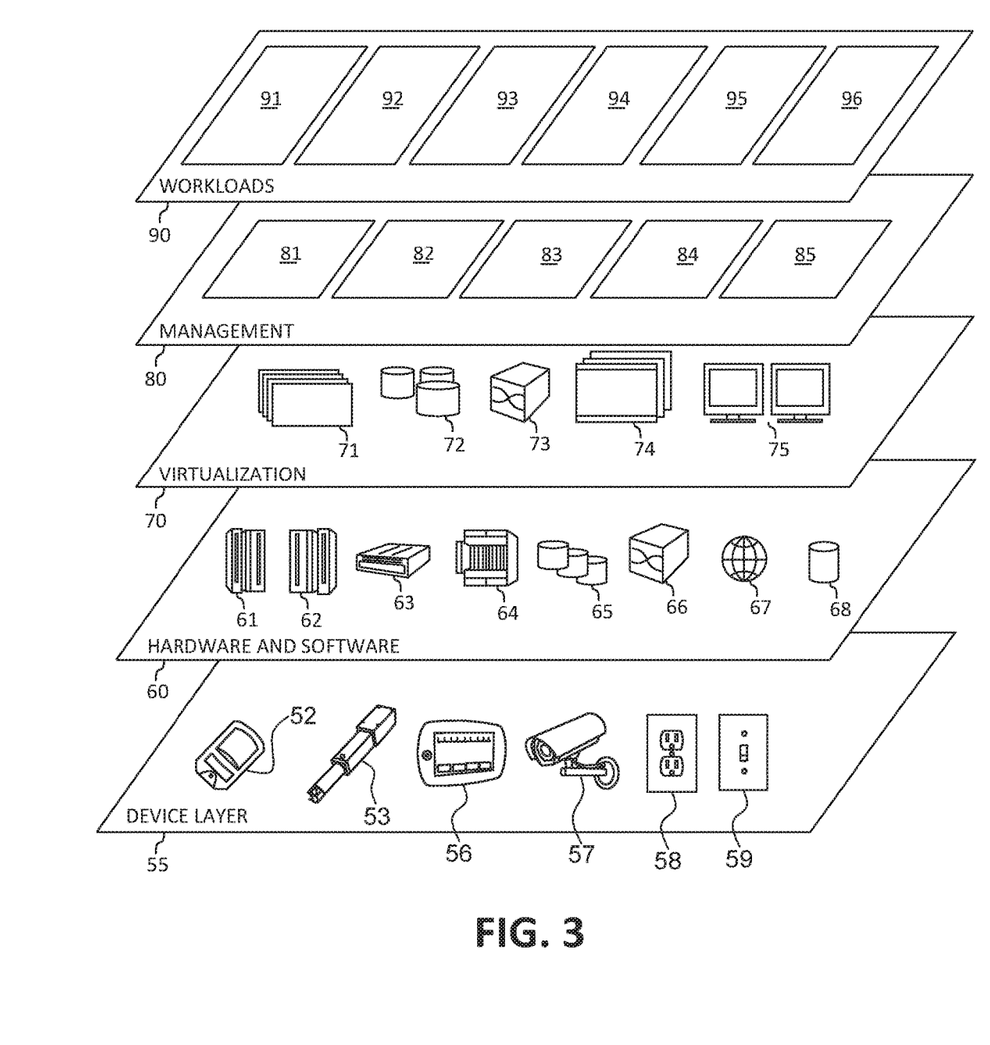
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for using pessimistic scheduling for topology optimized workload placement. In addition, workloads and functions 96 for using pessimistic scheduling for topology optimized workload placement may include such operations as data analytics, data analysis, and as will be further described, notification functionality. One with ordinary skill in the art will appreciate that the workloads and functions 96 for using pessimistic scheduling for topology optimized workload placement may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for using pessimistic scheduling for topology optimized workload placement in a cloud-computing environment. An excessive amount of computing resources may be requested (e.g., a pessimistic request) to execute a workload as compared to a required amount of the computing resources to execute the workload. The workload may be assigned to a selected configuration of the excessive amount of computing resources and release a remaining amount of the excessive amount of computing resources.

Figure 4A:
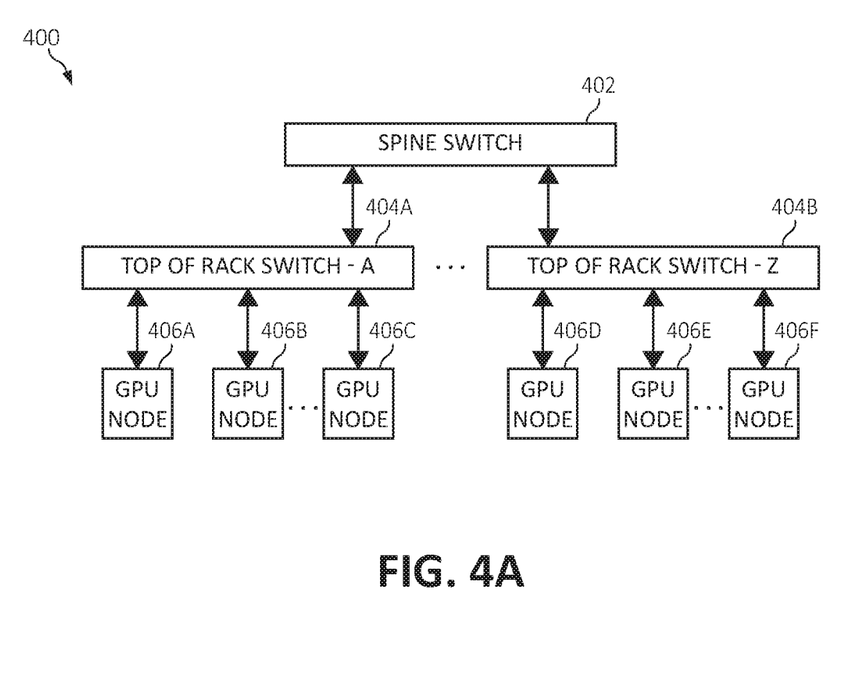
FIG. 4A is an additional block diagram depicting various user hardware and computing components functioning in accordance with aspects of the present invention.
Figure 4B:
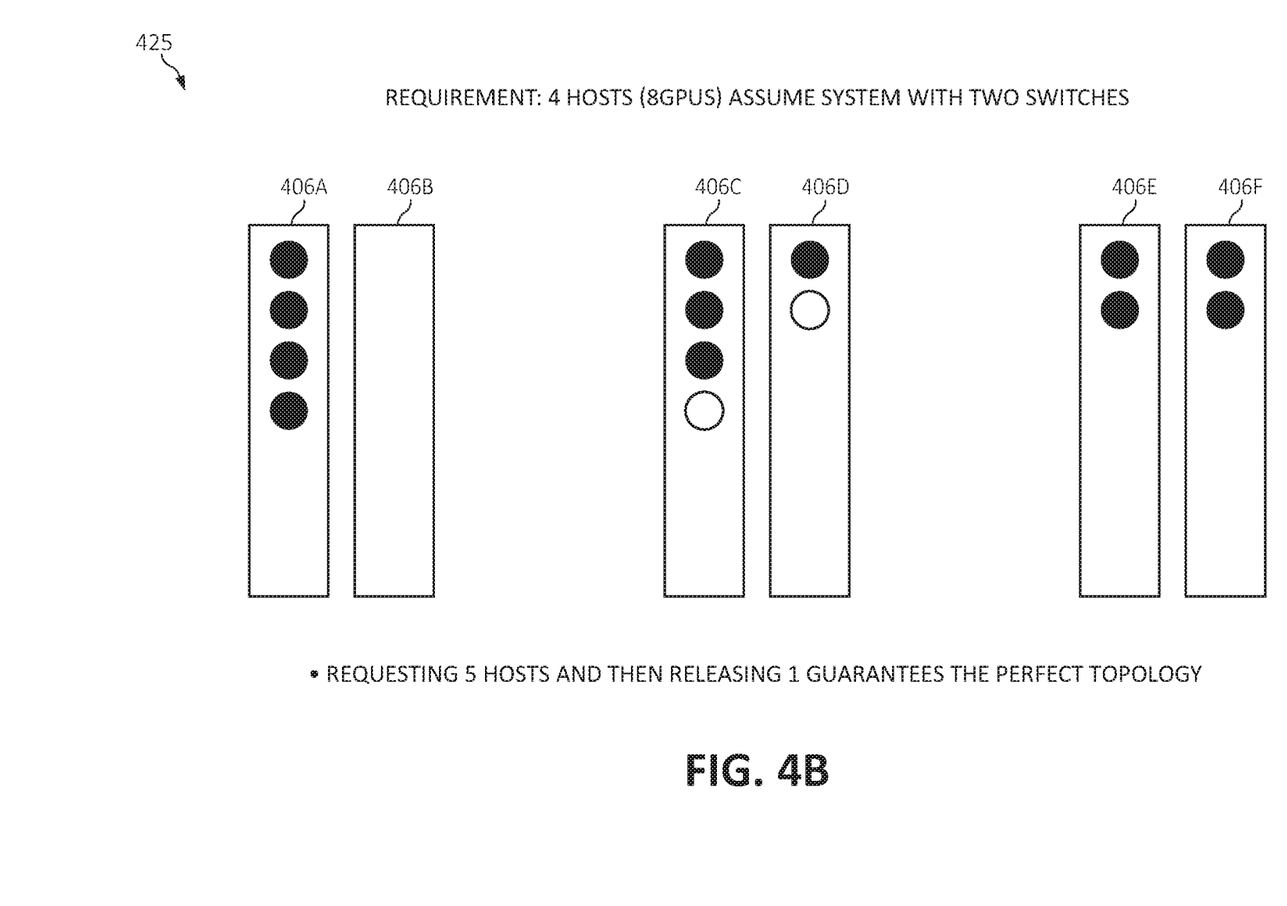
FIG. 4B is a diagram depicting an exemplary use case using pessimistic scheduling for topology optimized workload placement in accordance with aspects of the present invention.
Figure 4C:
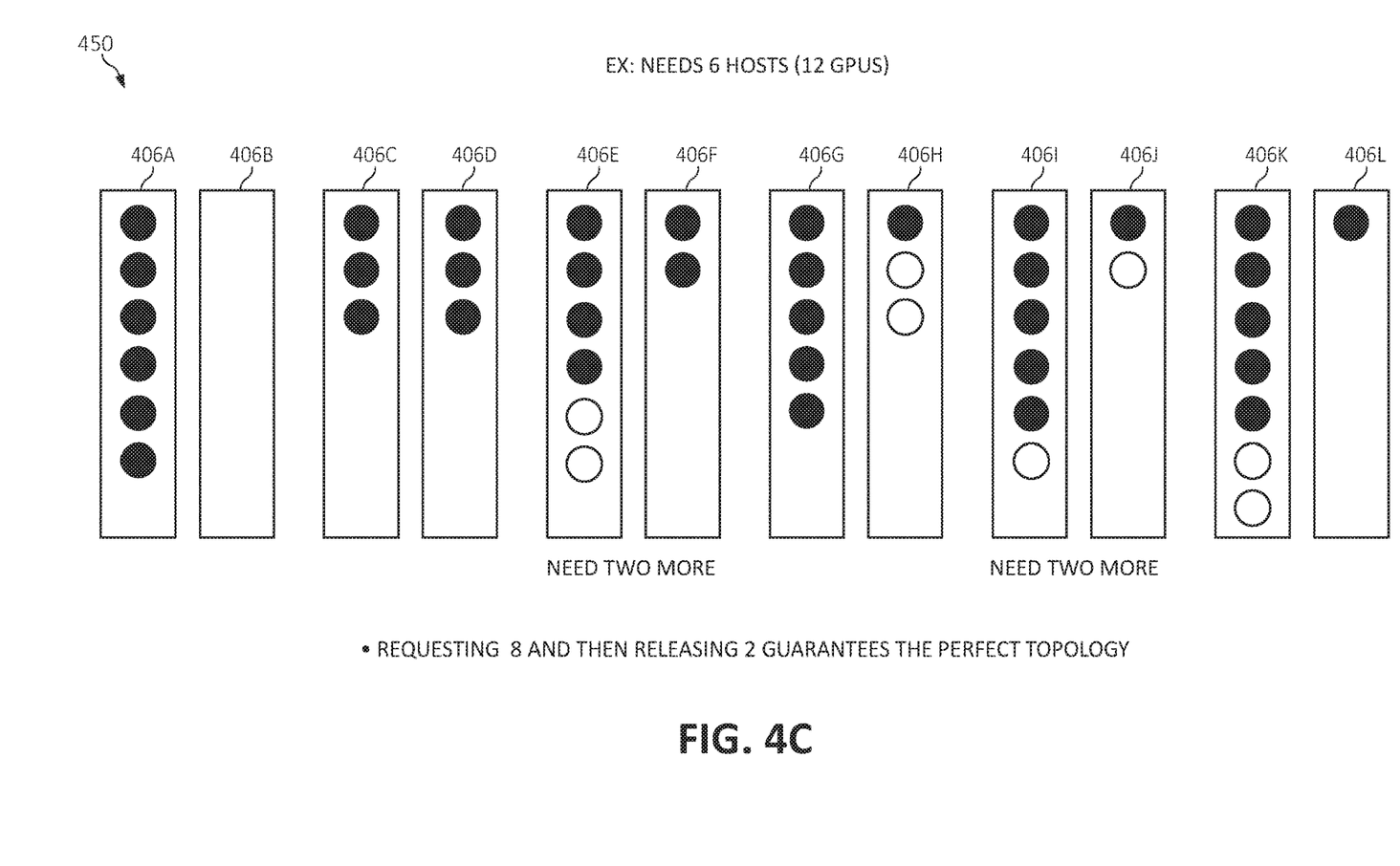
FIG. 4C is a diagram depicting an exemplary use case using pessimistic scheduling for topology optimized workload placement in accordance with aspects of the present invention.

Turning now to FIG. 4A, a block diagram depicting exemplary functional components of a computing system 400 according to various mechanisms of the illustrated embodiments is shown. FIGS. 4B and 4C depict exemplary use cases 425 and 435 using pessimistic scheduling for topology optimized workload placement such as, for example, using the computing system 400. In one aspect, one or more of the components, modules, services, applications, and/or functions described in FIGS. 1-3 may be used in FIG. 4A-4C.

As illustrated, a cloud computing environment of computing system 400 of FIG. 4A may include a switch 402 (e.g., a spine switch), one or more rack switches such as, for example, switch A 404A and switch Z 404B, and one or more GPU nodes such as, for example GPU nodes 406A-F, each of which may be in communication with each other and may be in a hierarchical/tree architectures.

To illustrate one or more aspects of the present invention, assume a job needs two nodes and both nodes under switch A 404A or switch Z 404B (e.g., a top of rack switch) that will yield an optimized and/or best performance and a job with one node under each switch (e.g., switch A 404A and switch Z 404B) may experience higher latency, lower bandwidth and potential contention across the spine switch 402, and even other software overhead (e.g., encapsulation) if the nodes are across subnets. Also, assume a job needs "n" number of nodes (e.g., GPU nodes 406A-F) with one or more the GPU nodes 406A-F under switch A 404A and some under switch Z 404B. If the GPU nodes 406A-F are not evenly divided, multiple flows may go over the shared spine switch 402. It is inevitable to have multiple switches, multiple subnets, etc., as part of a cloud system 400 (such as Deep Learning as a Service "DLaaS" cluster).

Accordingly, the present invention provides for provisioning one or more resources for a job such that all resources are in as close proximity as possible. If the resources have to be provisioned from different pools, a fewest number of pools may be provided. The number of resources in each pool may be balanced to localize the communication and only cross boundaries the fewest number of times. In this way, the present invention overcomes the current challenge where cloud schedulers such as those in Kuberentes, are unable to provides such functionality.

In one aspect, the present invention provides for a 1) a pessimistic resource requester, 2) a placement evaluation engine, and 3) a placement orchestrator. The pessimistic resource requester communicates with a cloud scheduler and requests more resources than necessary to run the workload. The number of resources the pessimistic resource requester will request depends on one or more factors, but the number of resources may be bounded (e.g., limited in number). For example, in a cloud system where a set of nodes are connected over 2 subnets, the pessimistic resource requester may request no more 50% more resources than required by the job so if a job requires "N" number of resources, where is a positive integer or defined value. The pessimistic resource requester may request three multiplied by N divided by 2 (e.g., 3*N/2) resources.

Then the placement evaluation engine may evaluate/estimate multiple configurations. That is, the placement evaluation engine may select/pick one or more different subsets of these resources with N elements and evaluates/estimates the future workload performance if these resources were to be allocated for the job. After a set of evaluations, the placement evaluation engine will arrive at the subset of combinations that result in optimal workload performance. The placement orchestrator may select/pick one of the optimal sub-sets, places the workload with the optimal sub-sets, and may release the other resources back to the cloud provider. In this way, the present invention addresses the network and input/output ("I/O") performance related issues that arise in large scheduler distributed learning HPC workloads in cloud and clustered systems. The workloads may be placed on commodity cloud infrastructure while achieving optimal performance and scalability.

For example, assume a workload requires/request 4 hosts (e.g., 8 GPUs) and assume the system includes two switches, as illustrated in FIG. 4A-B. For example, each dot (e.g., solid black dot/circle or white dot/circle) is a host. The solid black dot/circle are already placed hosts, and clear/white dots/circles are possible locations for a remaining placement. For example, in 406A-B there are already 4 hosts placed on one side (e.g., node 406A) therefor where the next host is positioned may be irrelevant or insignificant. In nodes 406E-F, there are already 4 hosts placed symmetrically on both sides and thus it does not matter where the last host is positioned. At this point, now 406 C-D covers the only possible case with 4 hosts already placed (e.g., 3 black dots on 406C and 1 on 406D). Then, the remaining host may go to either side (e.g., either node 406C or 406D), but regardless of which side the host is placed, if the clear/white dot on node 406C is selected, the host on node 406C resembles node 406A, otherwise the host is placed on node 406D and node 406D resembles nodes 406 E and F.

Thus, the pessimistic resource requester communicates with a cloud scheduler and requests more resources than necessary to run the workload such as, for example, requesting 5 resources (e.g., GPU 406A and 406C-D). The number of resources the pessimistic resource requester will request depends on one or more factors but the number of resources may be bounded (e.g., limited in number). In one aspect, the factors may include, but not limited to, how many hosts are available under each switch, how many switchers are available, how many hosts does a selected job require, a priority of the host/GPU (e.g., do not use high priority hosts or take into account reserved hosts), and/or maintenance factors (e.g., a GPU being configured (if broken) and under maintenance). The placement orchestrator may release the other resources (e.g., GPU 406B) back to the cloud provider so as to guarantee the optimized/perfect topology.

As an additional use case example, as illustrated in FIG. 4C, a workload requires/request 6 hosts (e.g., 12 GPUs such as, for example, 406A-L). Thus, the pessimistic resource requester communicates with a cloud scheduler and requests more resources than necessary to run the workload such as, for example, requesting 8 resources (e.g., GPU 406A and 406C-L). The number of resources the pessimistic resource requester will request depends on one or more factors, but the number of resources may be bounded (e.g., limited in number). The placement orchestrator may request 2 other resources from the cloud provider so as to guarantee the optimized/perfect topology. That is, requesting 8 resources guarantees work for the 6 required GPUs. Thus, 2 resources may be released (e.g., 8 GPUs–6 GPUs=2 GPUs) and only 6 will be used. Then, other resources may be released except for the 6 hosts (e.g., black dots of GPU node 406C). For example, both hosts could be from GPU node 406C or one from GPU node 406C and the other from GPU node 406D. Additionally, in GPU node 406E-F/I-J 8 hosts were requested but only 6 have been placed therefor fails to provide an adequate solution. Thus, unlike the request and release explained above with 406A (with 6 black dots) or 406C and D, it is imperative to determine where the two remaining hosts may be positioned/place (e.g., possible spots are white dots of 406E-F and/or I-J). 406E-40L cover all possible cases and therefor proves that the requested 8 hosts is sufficient to have a balanced topology for 6 hosts.

Figure 5:
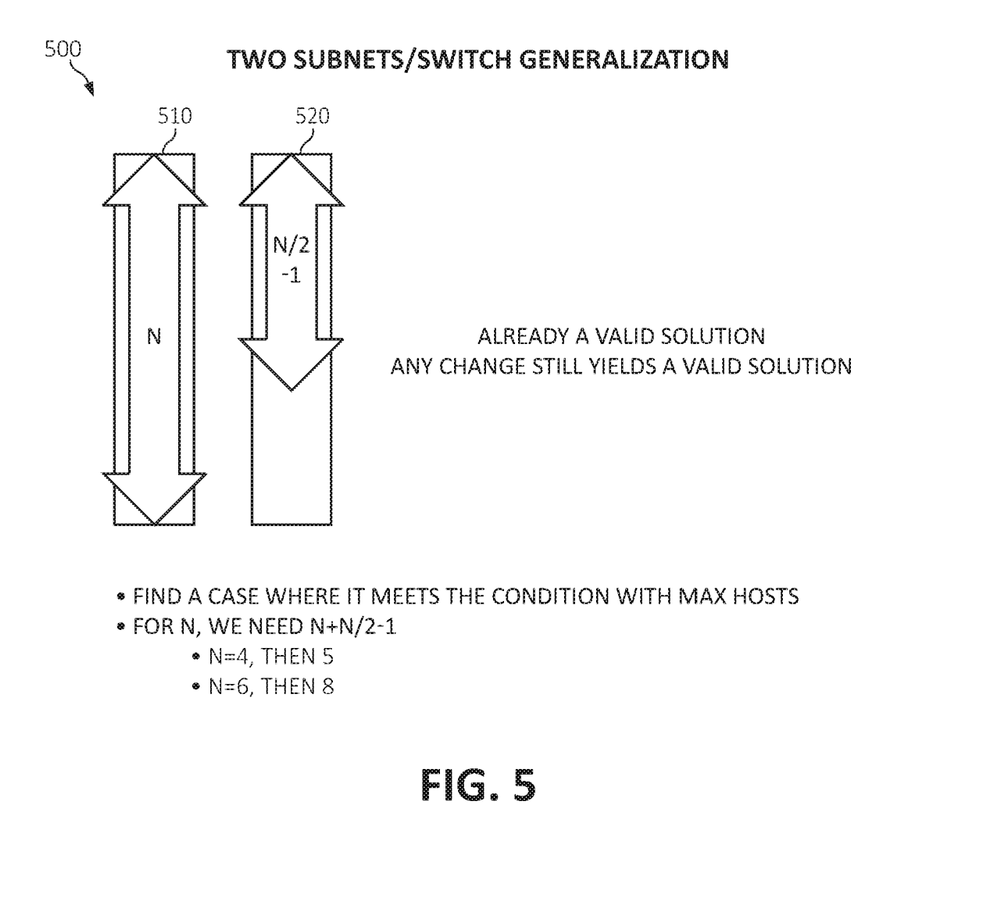
FIG. 5 is a diagram depicting subnet/switch generalization for pessimistic scheduling for topology optimized workload placement in accordance with aspects of the present invention.

Turning now to FIG. 5, diagram 500 depicts subnet/switch 510 and 520 generalization for pessimistic scheduling for topology optimized workload placement. In one aspect, one or more of the components, modules, services, applications, and/or functions described in FIGS. 1-4 may be used in FIG. 5. In one aspect, the present invention identifies a case where a condition with a maximum amount of host are located. That is, for N number of hosts, a pessimistic resource requester may request a surplus amount of resources according to the following equation:

$$\left(N + \frac{N}{2}\right) - 1, \qquad (1).$$

For example, if N is equal to 4, then.

$$\left(4 + \frac{4}{2}\right) - 1 = 5.$$

Thus, the pessimistic resource requester requests 5 resources where only 4 are requested. If N is equal to 6, then.

$$\left(6 + \frac{6}{2}\right) - 1 = 8.$$

The pessimistic resource requester may request 8 host resources where only 6 hosts are requested.

Figure 6:
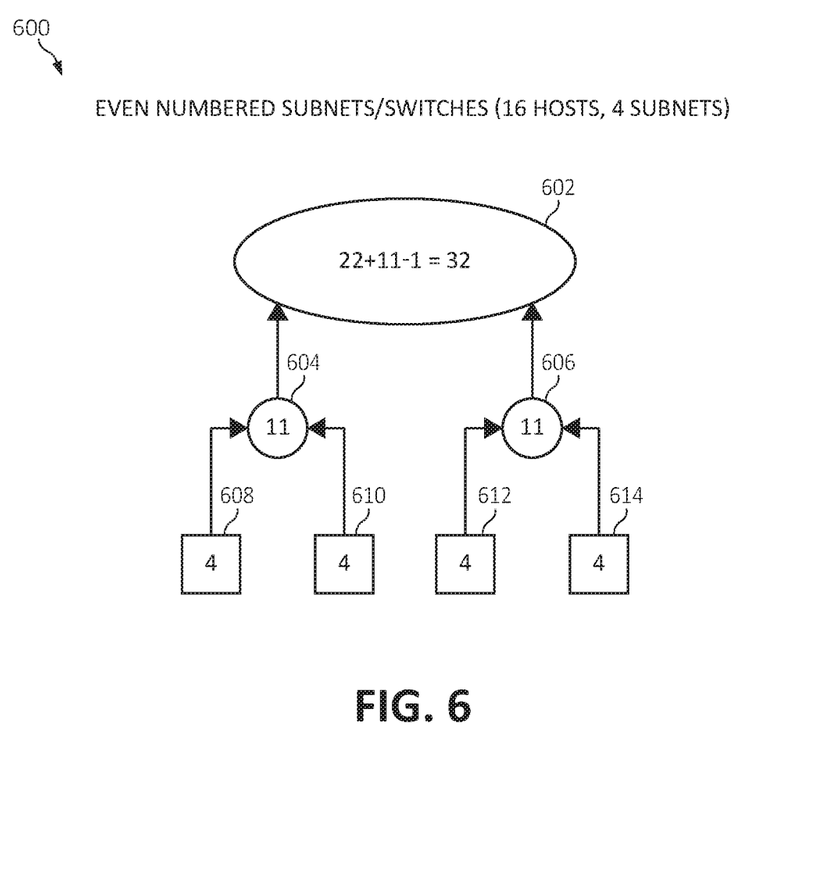
FIG. 6 is a diagram depicting an even number of subnet/switches for pessimistic scheduling for topology optimized workload placement in accordance with aspects of the present invention.

FIG. 6 is a diagram depicting an additional use case 600 of an even number of subnet/switches for pessimistic scheduling for topology optimized workload placement. In one aspect, one or more of the components, modules, services, applications, and/or functions described in FIGS. 1-4 may be used in FIG. 6.

That is, FIG. 600 depicts a use case of a workload request for an even numbered subnets/switches such as, for example, 16 hosts and 4 subnets. As illustrated, switches 602 are in communication with computing resources 604 and 606, which in turn are in communication with GPU's 608, 610, 612, and 614.

Using equation 1 above, a request for a workload of 16 hosts and 4 subnets produce a pessimistic request of resources for the GPU's 608, 610, 612, and 614 where (e.g., N=16) is the total workload of 16 hosts:

$$\left(16 + \frac{16}{2}\right) - 1 = 11. \quad (2)$$

Thus, computing resources 604 and 606 may have 11 computing resources to enable 4 subnets on GPU's 608, 610, 612, and 614. In turn, because computing resources 604 and 606 require 11 computing resources, a pessimistic request for computing resources may be performed yielding 32 computing resources for the switch 602 for the both of the 11 require computing resources for 604 and 606 as illustrated by applying equation 1 above, where N is 22:

$$\left(22 + \frac{22}{2}\right) - 1 = 11. \quad (3)$$

Thus, switch 602 may have 32 computing resources and provides 16 required hosts to enable 11 subnets on the computing resources for 604 and 606.

Figure 7:
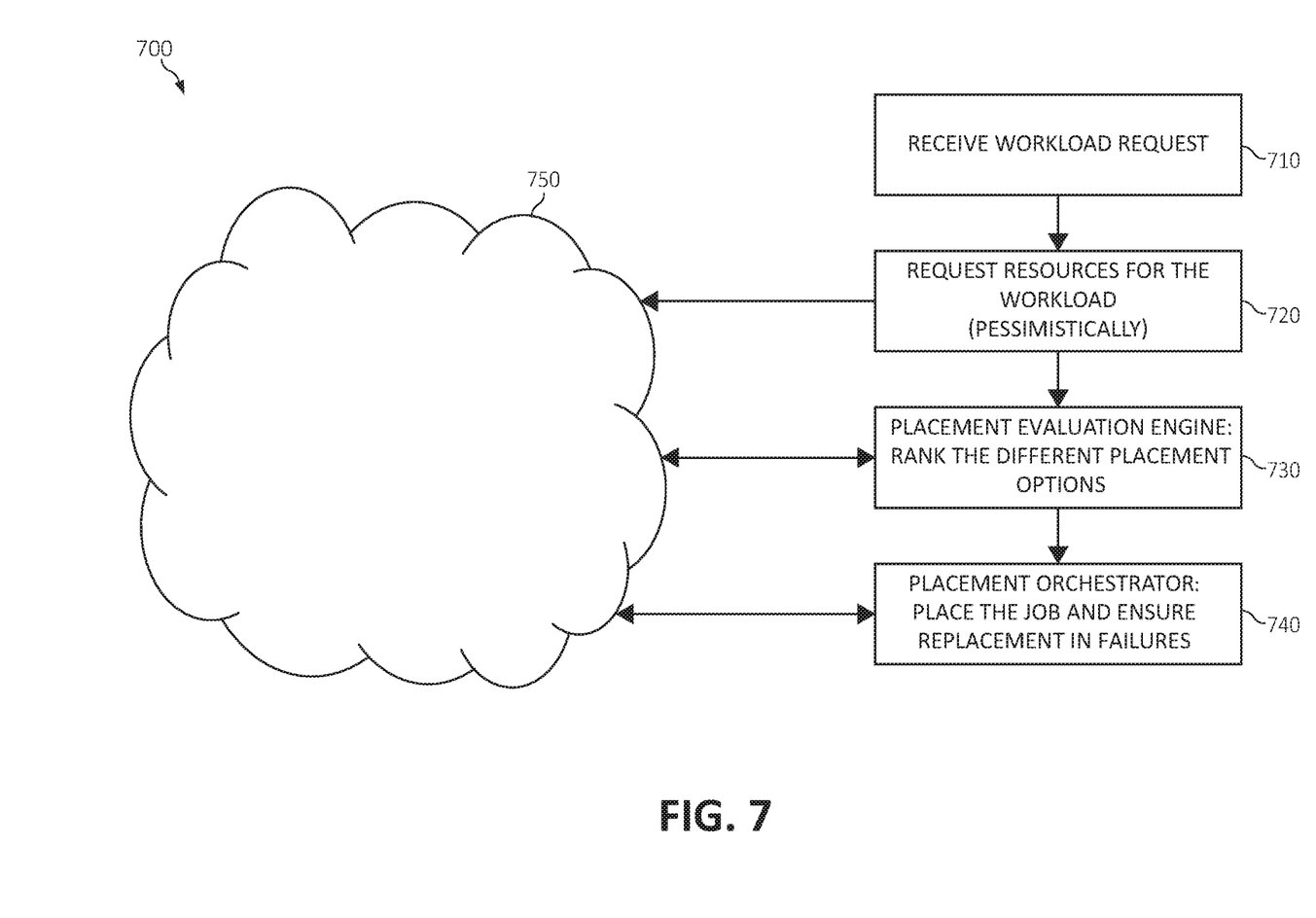
FIG. 7 is a flowchart diagram depicting an exemplary method for using pessimistic scheduling for topology optimized workload placement in a cloud computing environment, again in which various aspects of the present invention may be realized.

FIG. 7 is a flowchart diagram 700 depicting an exemplary method for using pessimistic scheduling for topology optimized workload placement in a computing environment, again in which various aspects of the present invention may be realized. The functionality 700 may be implemented as a method executed as instructions on a machine, where the instructions are included on at least one computer readable medium or one non-transitory machine-readable storage medium.

The functionality 700 may start by receiving a workload request, as in block 710. Computing resources may be requested (e.g., pessimistically requested by a pessimistic requester), from a cloud computing system 750, for the requested workload, as in block 720. That is, the amount of computing resources requested for the workload may be in excesses of the actual amount requested. In one aspect, the pessimistic requester requests more resources than necessary where the actual number of requested resources is bounded and tied to the requested number, maintains extra resources for a finite period of time, applies an exponential back-off operation to alleviate pressure on the system, and/or a user may be disabled as necessary.

A plurality of workload placements options/configurations (e.g., configurations of computing resources from the cloud computing system 750) may be ranked (e.g., using a placement evaluation engine), as in block 730. In one aspect, the placement evaluation engine may evaluate and/or estimate evaluation can be performed using IP to node mapping (e.g., using part of the IP address to determine which nodes belong to what subnet). In an additional aspect, the placement evaluation engine may perform microbenchmarks to characterize the latency and bandwidth between nodes and use that knowledge in node selection. Also, microbenchmarks can be run on-demand for this selection (and/or to evaluate the selection based on dynamic state of the system). Different placement strategies may be ranked in the order of their resulting performance.

A workload (e.g., a workload job) may be placed with one of the pluralities of workload placements options/configurations (e.g., configurations of computing resources from the cloud computing system 750) via a placement orchestrator and may ensure a replacement in one or more failures, as in block 740. That is, the placement orchestrator may place/assign the workload on a select number of nodes and the remaining resources of the remaining nodes may be released back to the cluster. In the event of node failure, the placement orchestrator may trigger the scheduler. In one aspect, the placement orchestrator may periodically evaluate the current configuration and recommended to replace the job.

Figure 8:
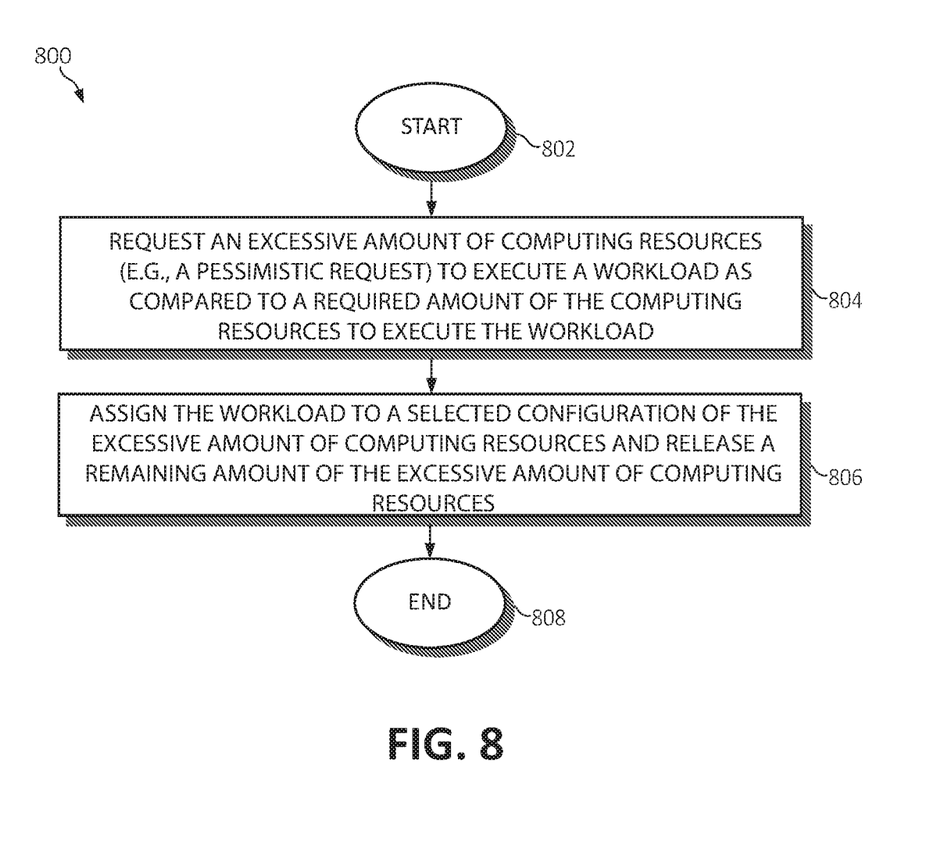
FIG. 8 is a flowchart diagram depicting an exemplary method for using pessimistic scheduling for topology optimized workload placement in a computing environment, again in which various aspects of the present invention may be realized.

FIG. 8 is an additional flowchart diagram 800 depicting an exemplary method for using pessimistic scheduling for topology optimized workload placement in a computing environment, again in which various aspects of the present invention may be realized. The functionality 800 may be implemented as a method executed as instructions on a machine, where the instructions are included on at least one computer readable medium or one non-transitory machine-readable storage medium. The functionality 800 may start in block 802.

An excessive amount of computing resources may be requested (e.g., a pessimistic request) to execute a workload as compared to a required amount of the computing resources to execute the workload, as in block 804. The workload may be assigned to a selected configuration of the excessive amount of computing resources and releasing a remaining amount of the excessive amount of computing resources, as in block 806. The functionality 800 may end, as in block 808.

In one aspect, in conjunction with and/or as part of at least one block of FIG. 8, the operations of method 800 may include each of the following. The operations of method 800 may perform one or more micro-benchmark operations to simulate behavior of the workload, estimate workload behavior of the workload according to one or more various configuration of the excessive amount of computing resources, and/or identify a subset of the excessive amount of computing resources that maximizes performance of the workload.

The operations of method 800 may rank each of a plurality of configuration of the excessive amount of computing resources according to an estimated workload performance and select, as the selected configuration of the excessive amount of computing resources, one of the plurality of configuration of the excessive amount of computing resources according to the ranking.

The operations of method 800 may retain the remaining amount of the excessive amount of computing resources for a selected time period and release the remaining amount of the excessive amount of computing resources back to a cluster of computing resources upon expiration of the selected time period.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for using pessimistic scheduling for topology optimized workload placement by a processor in a computing environment, comprising:
   requesting, by a resource requester to a workload scheduler, an excessive amount of computing resources to execute a workload, the excessive amount of computing resources known to the resource requester prior to the request to be more resources than necessary to execute the workload as compared to a required amount of the computing resources necessary to execute the workload, wherein a number of the excessive amount of computing resources able to be requested by the resource requester is limited to a predefined percentage over the required amount of the computing resources necessary to execute the workload for a given number of subnets connecting the computing resources; and
   assigning, by the workload scheduler, the workload to a selected configuration of the excessive amount of computing resources and releasing a remaining amount of the excessive amount of computing resources over which are more resources than necessary to execute the workload.

2. The method of claim 1, further including performing one or more micro-benchmark operations to simulate behavior of the workload.

3. The method of claim 1, further including estimating workload behavior of the workload according to one or more various configuration of the excessive amount of computing resources.

4. The method of claim 1, further including identifying a subset of the excessive amount of computing resources that maximizes performance of the workload.

5. The method of claim 1, further including ranking each of a plurality of configuration of the excessive amount of computing resources according to an estimated workload performance.

6. The method of claim 5, further including selecting, as the selected configuration of the excessive amount of computing resources, one of the plurality of configuration of the excessive amount of computing resources according to the ranking.

7. The method of claim 1, further including:
   retaining the remaining amount of the excessive amount of computing resources for a selected time period; and
   releasing the remaining amount of the excessive amount of computing resources back to a cluster of computing resources upon expiration of the selected time period.

8. A system for using pessimistic scheduling for topology optimized workload placement by a processor in a computing environment, comprising:
   one or more computers with executable instructions that when executed cause the system to:
   request, by a resource requester to a workload scheduler, an excessive amount of computing resources to execute a workload, the excessive amount of computing resources known to the resource requester prior to the request to be more resources than necessary to execute the workload as compared to a required amount of the computing resources necessary to execute the workload, wherein a number of the excessive amount of computing resources able to be requested by the resource requester is limited to a predefined percentage over the required amount of the computing resources necessary to execute the workload for a given number of subnets connecting the computing resources; and
   assign, by the workload scheduler, the workload to a selected configuration of the excessive amount of computing resources and releasing a remaining amount of the excessive amount of computing resources over which are more resources than necessary to execute the workload.

9. The system of claim 8, wherein the executable instructions further perform one or more micro-benchmark operations to simulate behavior of the workload.

10. The system of claim 8, wherein the executable instructions further estimate workload behavior of the workload according to one or more various configuration of the excessive amount of computing resources.

11. The system of claim 8, wherein the executable instructions further identify a subset of the excessive amount of computing resources that maximizes performance of the workload.

12. The system of claim 8, wherein the executable instructions further rank each of a plurality of configuration of the excessive amount of computing resources according to an estimated workload performance.

13. The system of claim 12, wherein the executable instructions further select, as the selected configuration of the excessive amount of computing resources, one of the plurality of configuration of the excessive amount of computing resources according to the ranking.

14. The system of claim 8, wherein the executable instructions further:
   retain the remaining amount of the excessive amount of computing resources for a selected time period; and
   release the remaining amount of the excessive amount of computing resources back to a cluster of computing resources upon expiration of the selected time period.

15. A computer program product for using pessimistic scheduling for topology optimized workload placement by a processor in a computing environment, the computer program product comprising a non-transitory computer-readable storage medium having computer-readable program code portions stored therein, the computer-readable program code portions comprising:
   an executable portion that requests, by a resource requester to a workload scheduler, an excessive amount of computing resources to execute a workload, the excessive amount of computing resources known to the resource requester prior to the request to be more resources than necessary to execute the workload as compared to a required amount of the computing resources necessary to execute the workload, wherein a number of the excessive amount of computing resources able to be requested by the resource requester is limited to a predefined percentage over the required amount of the computing resources necessary to execute the workload for a given number of subnets connecting the computing resources; and
   an executable portion that assigns, by the workload scheduler, the workload to a selected configuration of the excessive amount of computing resources and releasing a remaining amount of the excessive amount of computing resources over which are more resources than necessary to execute the workload.

16. The computer program product of claim 15, further including an executable portion that performs one or more micro-benchmark operations to simulate behavior of the workload.

17. The computer program product of claim 15, further including an executable portion that estimates workload behavior of the workload according to one or more various configuration of the excessive amount of computing resources.

18. The computer program product of claim 15, further including an executable portion that identifies a subset of the excessive amount of computing resources that maximizes performance of the workload.

19. The computer program product of claim 15, further including an executable portion that:
   ranks each of a plurality of configuration of the excessive amount of computing resources according to an estimated workload performance; and
   selects, as the selected configuration of the excessive amount of computing resources, one of the plurality of configuration of the excessive amount of computing resources according to the ranking.

20. The computer program product of claim 15, further including an executable portion that:
   retains the remaining amount of the excessive amount of computing resources for a selected time period; and
   releases the remaining amount of the excessive amount of computing resources back to a cluster of computing resources upon expiration of the selected time period.

\* \* \* \* \*